US008155945B2

(12) United States Patent
Konno

(10) Patent No.: US 8,155,945 B2
(45) Date of Patent: Apr. 10, 2012

(54) IMAGE PROCESSING APPARATUS, IMAGE PROCESSING METHOD, COMPUTER-READABLE MEDIUM AND COMPUTER DATA SIGNAL

(75) Inventor: Yuya Konno, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 552 days.

(21) Appl. No.: 12/388,033

(22) Filed: Feb. 18, 2009

(65) Prior Publication Data
US 2010/0057434 A1 Mar. 4, 2010

(30) Foreign Application Priority Data

Aug. 28, 2008 (JP) ................................. 2008-219339

(51) Int. Cl.
*G06F 17/28* (2006.01)
(52) U.S. Cl. ..................... 704/3; 704/2; 704/5
(58) Field of Classification Search ................ 704/1–10, 704/257, 277, 251–255, 270; 382/289, 305
See application file for complete search history.

(56) References Cited

U.S. PATENT DOCUMENTS

| 5,727,082 | A | 3/1998 | Sugishima | |
|---|---|---|---|---|
| 7,620,268 | B2 * | 11/2009 | Myers et al. | 382/289 |
| 2002/0064316 | A1 * | 5/2002 | Takaoka | 382/305 |
| 2006/0217954 | A1 | 9/2006 | Koyama et al. | |
| 2006/0217960 | A1 | 9/2006 | Kato et al. | |
| 2006/0218484 | A1 | 9/2006 | Saito et al. | |

FOREIGN PATENT DOCUMENTS

| JP | 2-253377 A | 10/1990 |
|---|---|---|
| JP | 5-324720 A | 12/1993 |
| JP | 7-23210 A | 1/1995 |
| JP | 07-028829 A | 1/1995 |
| JP | 08-006948 A | 1/1996 |
| JP | 3213197 A | 1/1996 |
| JP | 10-164356 A | 6/1998 |
| JP | 2000-137713 A | 5/2000 |
| JP | 3636490 B2 | 1/2005 |
| JP | 2006-109142 A | 4/2006 |

(Continued)

OTHER PUBLICATIONS

Australian Office Action dated Mar. 22, 2010, issued in a counterpart Australian patent Application No. 2009200633.

(Continued)

*Primary Examiner* — Huyen X. Vo
(74) *Attorney, Agent, or Firm* — Sughrue Mion, PLLC

(57) ABSTRACT

An image processing apparatus includes an image receiving unit, a writing detection unit, a writing deletion unit, a character recognition unit, a character string generation unit, a translation unit and a translation image generation unit. The image receiving unit receives an image including a writing. The writing detection unit detects a position of the writing. The writing deletion unit deletes the writing from the received image based on the position of the writing. The character recognition unit recognizes characters in the image from which the writing has been deleted. The character string generation unit generates a character string by inserting a code representative of the writing into the recognition result based on the position of the writing. The translation unit translates the character string. The translation image generation unit generates, based on the translation result, an image of the translation result including an image corresponding to the writing.

6 Claims, 16 Drawing Sheets

FOREIGN PATENT DOCUMENTS

JP      2006-276913 A     10/2006
JP      2006-276919 A     10/2006

OTHER PUBLICATIONS

Xiaofan Lin et al, "*Active Document Versioning: from layout understanding to Adjustment*"; Proceedings of SPIE, the International Society for Optical Engineering, Document Recognition and Retrieval Conference XIII, vol. 6067, California,• USA, Jan. 16, 2006.

Japanese Office Action issued Jul. 6, 2010 in Japanese Application No. 2008-219339.

\* cited by examiner

FIG. 9

```
<region1>
「私たちが大切にすること」
</region1>
<region2>
<marker/>で宣言した意志
を、責任をもって実現していくスタート
ポイントとして、まずお客様の満足を
大切にしていかなければなりません。
</region2>
<region3>
< marker/ >は、社会の
一員としての責任とビジネスの姿勢、
人間性をベースにした個人の在りよう
を10の価値で構成しています。
</region3>
```

900

910

920

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-219339 filed on Aug. 28, 2008.

BACKGROUND

1. Technical Field

The invention relates to an image processing apparatus, an image processing method, a computer-readable medium and a computer-data signal.

2. Related Art

There is a technology of performing character recognition on a character image in a document image and thereafter, translating it into a different language.

There is also a technology of processing a document based on a writing made on the document.

SUMMARY

According to an aspect of the invention, an image processing apparatus includes an image receiving unit, a writing detection unit, a writing deletion unit, a character recognition unit, a translation target character string generation unit, a translation unit and a translation image generation unit. The image receiving unit receives an image including a writing. The writing detection unit detects a position of the writing in the image received by the image receiving unit. The writing deletion unit that deletes the writing from the received image based on the position of the writing detected by the writing detection unit. The character recognition unit recognizes characters in the image from which the writing has been deleted by the writing deletion unit. The translation target character string generation unit generates a translation-target character string by inserting a code representative of the writing into a result of the recognition by the character recognition unit based on the position of the writing detected by the writing detection unit. The translation unit translates the translation-target character string generated by the translation target character string generation unit. The translation image generation unit generates, based on a result of the translation by the translation unit, an image of the result of the translation that includes an image corresponding to the writing.

BRIEF DESCRIPTION OF THE DRAWINGS

Exemplary embodiments of the invention will be described in detail based on the following figures, wherein:

FIG. 9 is an explanatory view showing an example of a translation target XML;

DETAILED DESCRIPTION

Hereinafter, an example of exemplary embodiments in implementing the invention will be described with reference to the drawings.

Figure 1:
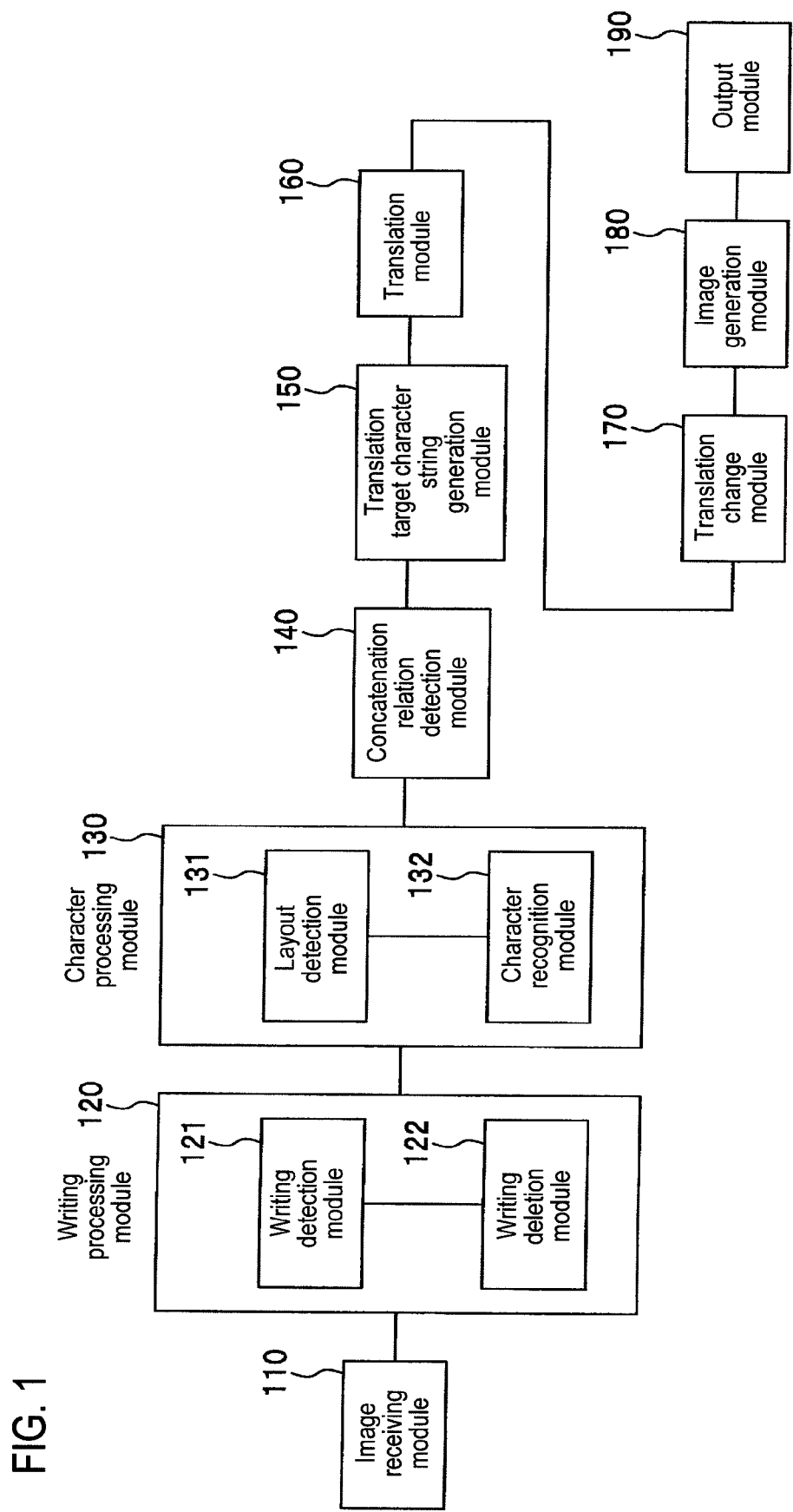
FIG. 1 is a conceptual module block diagram of a structure example according to an exemplary embodiment of the invention.

FIG. 1 is a conceptual module block diagram of a structure example according to the exemplary embodiment.

A module generally refers to a logically separable part such as software (computer program) or hardware. Therefore, the modules in this exemplary embodiment refer not only to modules in computer programs but also to modules in hardware structures. Therefore, the description of this exemplary embodiment is also a description of a computer program, a system, and a method. Here, for convenience of explanation, "store", "stored", and a word equivalent thereto are used, and these words mean, when the exemplary embodiment is a computer program, storing in a storage or controlling so as to be stored in a storage. While the modules correspond to functions substantially one to one, in mounting, one module may be constituted by one program, a plurality of modules may be constituted by one program, or one module may be constituted by a plurality of programs. Moreover, a plurality of modules may be executed by one computer, or one module may be executed by a plurality of computers in a distributed or parallel environment. One module may include another module. Moreover, hereinafter, "connection" is used in the case of logical connection (data transmission and reception, instruction, reference relationship between pieces of data) as well as in the case of physical connection.

Moreover, a system or an apparatus is constituted by a plurality of computers, pieces of hardware, apparatuses or the like connected by communication means such as a network (including a one-to-one correspondence communication connection), and a case where it is implemented by one computer, piece of hardware, apparatus or the like is also included. "Apparatus" and "system" are used as words synonymous with each other. "Predetermined" refers to being before the object processing, and is used with meanings including being determined not only before the start of the processing by this exemplary embodiment but also according to the situation or condition at that time or according to the situation or condition up to that time even after the start of the processing by this exemplary embodiment.

This exemplary embodiment is provided with, as shown in FIG. 1, an image receiving module 110, a writing processing module 120, a character processing module 130, a concatenation relation detection module 140, a translation target character string generation module 150, a translation module 160, a translation change module 170, an image generation module 180, and an output module 190. In this exemplary embodiment, for example, when a document is translated and made open to the public, character recognition and translation are performed for the original document where private information or the like is hidden by being painted out with black, thereby generating a translated document.

The image receiving module 110 that is connected to the writing processing module 120 receives an image, and passes the image to the writing processing module 120. Receiving of an image includes reading an image with a scanner, receiving an image by fax, and reading an image from an image database or the like. It is assumed that the image includes a writing by a user. The number of images may be one or more than one. The contents of the image may be a business document, an advertising brochure, or the like. This image is an image to be translated (translation target). The writing included in the image refers to, for example, specifically, an image added to indicate a portion where information described in the document should be hidden when the document is made open to the public. More specifically, the writing refers to a black marker (black area) or the like to hide a character(s). It should be noted that the writing is not limited to the black marker. Hereinafter, description will be given mainly with the black marker as an example. Whether the black marker is handwritten or not does not matter.

The writing processing module 120 is connected to the image receiving module 110 and the character processing module 130, and has a writing detection module 121 and a writing deletion module 122. The writing processing module 120 receives an image from the image receiving module 110, detects a black marker in the image by using the writing detection module 121, deletes the black marker by using the writing deletion module 122, and generates an image with no black marker. Then, the writing processing module 120 passes the generated image to the character processing module 130.

The writing detection module 121 is connected to the writing deletion module 122. The writing detection module 121 detects a position of a black marker in the image received by the image receiving module 110. To detect the black marker, a feature of the black marker (for example, being an area constituted by black pixels the number of which is equal to or greater than a predetermined threshold value, or being a rectangular area in which a proportion of black pixels is equal to or greater than a predetermined threshold value) is extracted, and an area having that feature is detected. The detection result indicates the position of the black marker (a length of the black marker may be included). The detection result is stored, for example, in a specified portion table 400.

Figure 4:
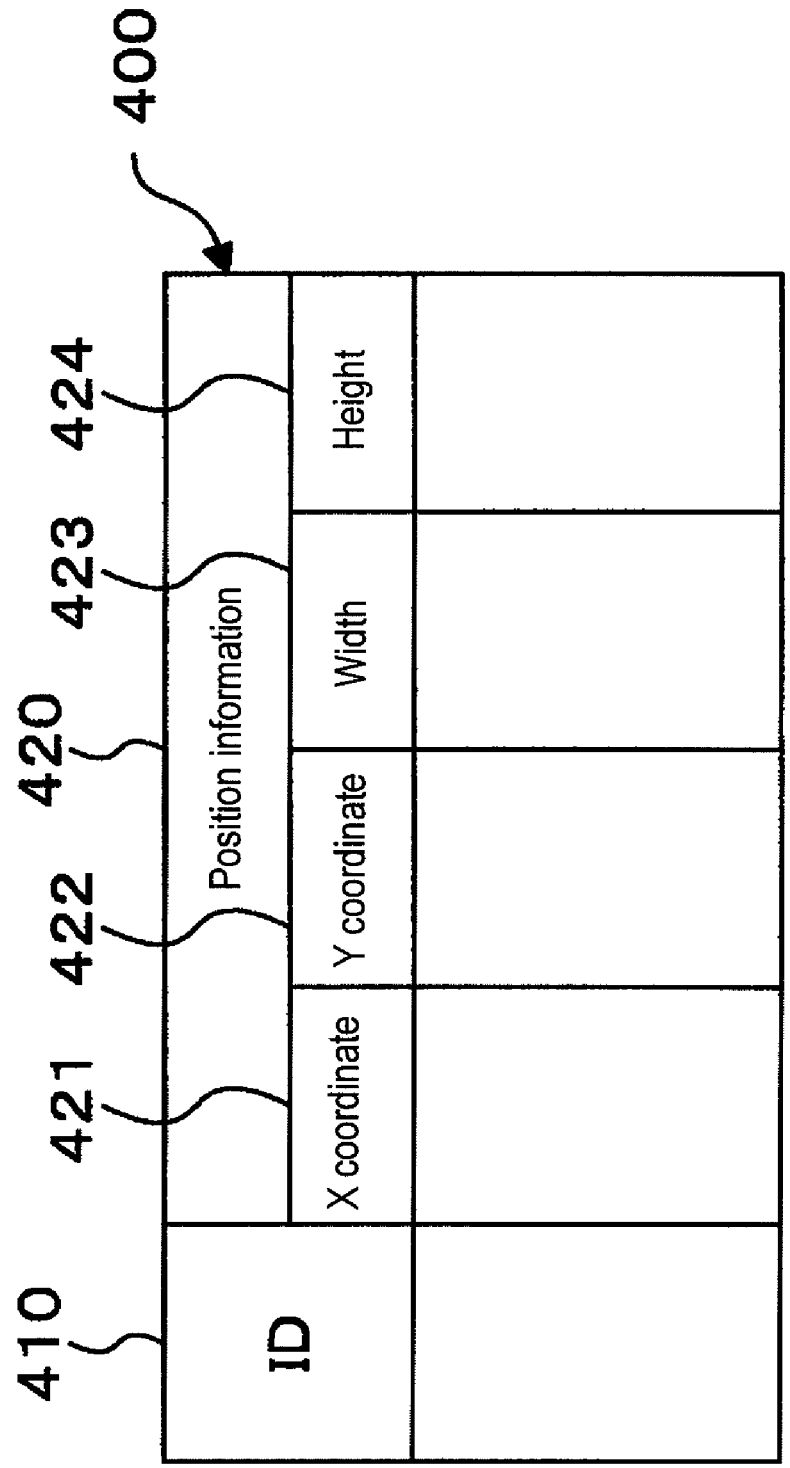
FIG. 4 is an explanatory view showing an example of the data structure of a specified portion table.

FIG. 4 is an explanatory view showing an example of the data structure of the specified portion table 400. The specified portion table 400 includes an ID column 410 and a position information column 420. The ID column 410 stores a black marker ID that is an identifier for uniquely identifying a black marker. The position information column 420 stores a position where the black marker is present. The position information column 420 includes an x-coordinate column 421, a y-coordinate column 422, a width column 423, and a height column 424. The x-coordinate column 421 and the y-coordinate column 422 store the coordinates of the upper left of the area (for example, a rectangle) where the writing is present, the width column 423 stores the width of the area (corresponding to the length of the black marker), and the height column 424 stores the height of the area. Hereinafter, the coordinates may be absolute coordinates (with the upper left in the image as the origin point, the rightward direction corresponds to the x-axis and the downward direction corresponds to the y-axis) in the image, or may be relative coordinates.

The writing deletion module 122 is connected to the writing detection module 121. The writing deletion module 122 deletes the black marker from the image received by the image receiving module 110, based on the position of the black marker detected by the writing detection module 121. For example, the writing deletion module 122 deletes the black marker by receiving the specified portion table 400 and replacing the black pixels in the area with white pixels. Thereby, the image becomes an image where there is no black marker. The writing deletion module 122 passes the image from which the black marker has been deleted, to the character processing module 130.

The character processing module 130 is connected to the writing processing module 120 and the concatenation relation detection module 140, and has a layout detection module 131 and a character recognition module 132. The character processing module 130 receives the image from which the black marker has been deleted, from the writing processing module 120, detects the layout (the position or the like of a character image, a line, a text area or the like) in the image by using the layout detection module 131, and performs character recognition for the character image in the image by using the character recognition module 132. Then, the character processing module 130 passes the detection result and the recognition result to the concatenation relation detection module 140.

The layout detection module 131 is connected to the character recognition module 132. The layout detection module 131 detects the position of the character image in the image from which the black marker has been deleted by the writing deletion module 122. For the detection of the character image position, character image extraction processing in a generally known character recognition technology may be used. For example, a histogram of black pixels (the occurrence frequency distribution of black pixels) in the horizontal or vertical direction in the image is generated, a line is extracted by extracting an area where the occurrence frequency is equal to or higher than a predetermined threshold value, and a histogram of black pixels in the vertical or horizontal direction in the line is generated, thereby extracting a character image. Moreover, a character image may be detected by using the sizes of a blank area and a predetermined character image. Moreover, an area in which character images are aligned in a predetermined direction (for example, the horizontal direction or the vertical direction) within a predetermined distance may be detected as a character line area. Further, an area in which such character line areas are aligned within a predetermined distance may be detected as a text area. That is, plural character line areas are present in a text area, and plural character images are present in a character line area. Then, the layout detection module 131 passes the position of the character image, which is the detection result, to the character recognition module 132. Moreover, the layout detection module 131 stores the detection result, for example, in a layout information table 500.

Figure 5:
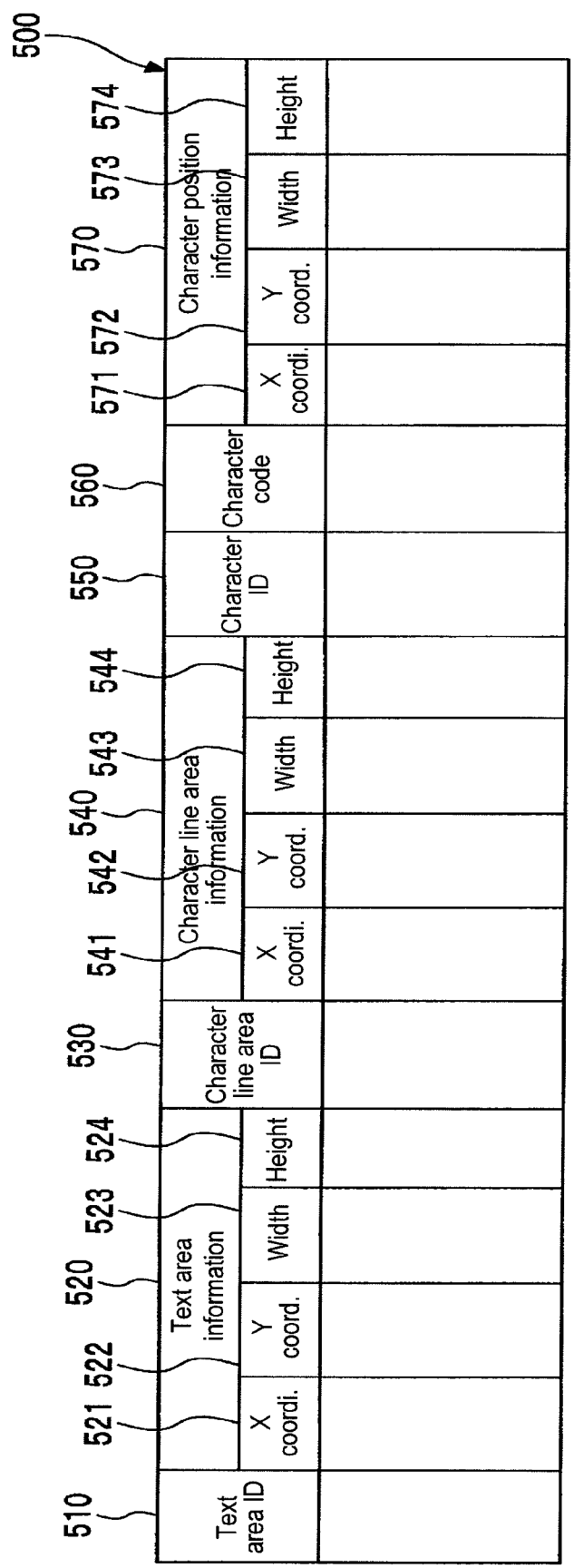
FIG. 5 is an explanatory view showing an example of the data structure of a layout information table.

FIG. 5 is an explanatory view showing an example of the data structure of the layout information table 500. The layout information table 500 includes a text area ID column 510, a text area information column 520, a character line area ID column 530, a character line area information column 540, a character ID column 550, a character code column 560, and a character position information column 570. The text area ID column 510 stores a text area ID that is an identifier for uniquely identifying a text area. The text area information column 520 includes an x-coordinate column 521, a y-coordinate column 522, a width column 523, and a height column 524. The x-coordinate column 521 and the y-coordinate column 522 store the coordinates of the upper left of the text area (for example, a rectangle), the width column 523 stores the width of the text area, and the height column 524 stores the height of the text area. The character line area ID column 530 stores a character line area ID that is an identifier for uniquely identifying a character line area. The character line area information column 540 includes an x-coordinate column 541, a y-coordinate column 542, a width column 543, and a height column 544. The x-coordinate column 541 and the y-coordinate column 542 store the coordinates of the upper left of the character line area (for example, a rectangle), the width column 543 stores the width of the character line area, and the height column 544 stores the height of the character line area. The character ID column 550 stores a character image ID that is an identifier for uniquely identifying a character image. The character code column 560 stores the result of the recognition by the character recognition module 132 for the character image. The character position information column 570 includes an x-coordinate column 571, a y-coordinate column 572, a width column 573, and a height column 574. The x-coordinate column 571 and the y-coordinate column 572 store the coordinates of the upper left of the character image (for example, a rectangle), the width column 573 stores the width of the character image, and the height column 574 stores the height of the character image. Moreover, the layout information table 500 shows an inclusion relationship between the text area, the character line area, and the character image. Moreover, the contents in the character position information column 570 may be modified by re-extracting the character image according to the result of the character recognition by the character recognition module 132.

The character recognition module 132 is connected to the layout detection module 131. The character recognition module 132 performs character recognition for the character image detected by the layout detection module 131. For the character recognition processing, a generally known character recognition technology may be used. For example, it may be performed to extract features (the number of lines, etc.) of the character image, compare its position in the feature space with characters in a dictionary and perform the character recognition (associates the character with any character code). The character recognition result is stored in the character code column 560 in the layout information table 500. Then, the character recognition module 132 associates the position of the character image with the character recognition result, and passes them to the concatenation relation detection module 140.

The layout detection processing by the layout detection module 131 may be performed after the character recognition processing by the character recognition module 132 is performed. That is, the character recognition module 132 may detect the position of the character image as well as perform the character recognition processing.

The concatenation relation detection module 140 is connected to the character processing module 130 and the translation target character string generation module 150. The concatenation relation detection module 140 detects a positional relation between the black marker detected by the writing detection module 121 and an image component (a character image, a character line area, a text area, etc.) other than the black marker detected by the layout detection module 131. Then, the concatenation relation detection module 140 detects a concatenation relation between the black marker and the image component based on the detected positional relation. That is, this concatenation relation is a concatenation relation between sentences. Then, the concatenation relation detection module 140 passes the detected concatenation relation to the translation target character string generation module 150.

Since the character recognition module 132 recognizes the image from which the black marker has been deleted, if the recognition result is translated as it is, the quality of the translation where natural language processing is performed would be degraded. Therefore, the translation target character string generation module 150 inserts a code representative of the black marker (substitute for the character(s) hidden by the marker) in the recognition result, and the concatenation relation detection module 140 performs the processing to determine a position where the code is to be inserted.

The translation target character string generation module 150 is connected to the concatenation relation detection module 140 and the translation module 160. The translation target character string generation module 150 inserts the code representative of the black marker in the result of the recognition by the character recognition module 132 based on the position of the black marker detected by the writing detection module 121, thereby generating a translation-target character string. For example, specifically, based on the concatenation relation detected by the concatenation relation detection module 140, the translation target character string generation module 150 inserts the code representative of the black marker in the result of the recognition by the character recognition module 132, thereby generating a translation-target character string. Then, the translation target character string generation module 150 passes the generated character string to the translation module 160. Specific examples of the code representative of the black marker include a marker in a language such as XML (extensible markup language) and a predetermined noun. That is, when the translation module 160 is capable of handling XML, a marker representative of a black marker is inserted. When the translation module 160 is incapable of handling XML, a predetermined noun is inserted. This is because a noun (particularly, a proper noun, a numeral, etc.) is highly likely hidden and frequently becomes a translation result as-is. When a noun is inserted, the translation target character string generation module 150 may check that the noun to be inserted is absent in the recognition result. When the noun is present in the recognition result, a different noun may be selected.

The translation module 160 is connected to the translation target character string generation module 150 and the translation change module 170. The translation module 160 translates the translation-target character string generated by the translation target character string generation module 150. Moreover, when translating, the translation module 160 may treat the code representative of the black marker as a noun. For example, specifically, when the translation module 160 is capable of handling XML, the translation module 160 may treat the marker representative of the black marker as a noun. When the translation module 160 is incapable of handling XML, the translation module 160 may translate a translation-target character string including a predetermined noun. Then, the translation module 160 passes the translated character string to the translation change module 170.

The translation change module 170 is connected to the translation module 160 and the image generation module 180. The translation change module 170 converts the translation result corresponding to the code representative of the black marker in the result of the translation by the translation module 160, into a code for generating an image of the black marker. The code for generating the image of the black marker is one that is used by the image generation module 180 to generate, in the image of the translation result, an image corresponding to a portion of the original image where the black marker is applied, and is, for example, specifically, a character code or the like representative of a black rectangle. Then, the translation change module 170 passes the converted translation result to the image generation module 180.

The image generation module 180 is connected to the translation change module 170 and the output module 190. The image generation module 180 generates an image of the translation result so that the image of the translation result includes the image corresponding to the black marker, based on the result of the translation by the translation change module 170. Moreover, the image generation module 180 may generate an image of the translation result converted by the translation change module 170. Moreover, the image generation module 180 may generates a hiding image as an image corresponding to the black marker detected by the writing detection module 121, according to the length of the black marker. Then, the image generation module 180 passes the generated image to the output module 190. The image generated by the image generation module 180 may be a file described in a page description language or the like.

The output module 190 is connected to the image generation module 180. The output module 190 receives the image from the image generation module 180, and outputs the image. Outputting of the image includes printing it with a printer, displaying it on a display, transmitting it with an image transmission apparatus such as a fax, and writing it into an image storage such as an image database.

Figure 2:
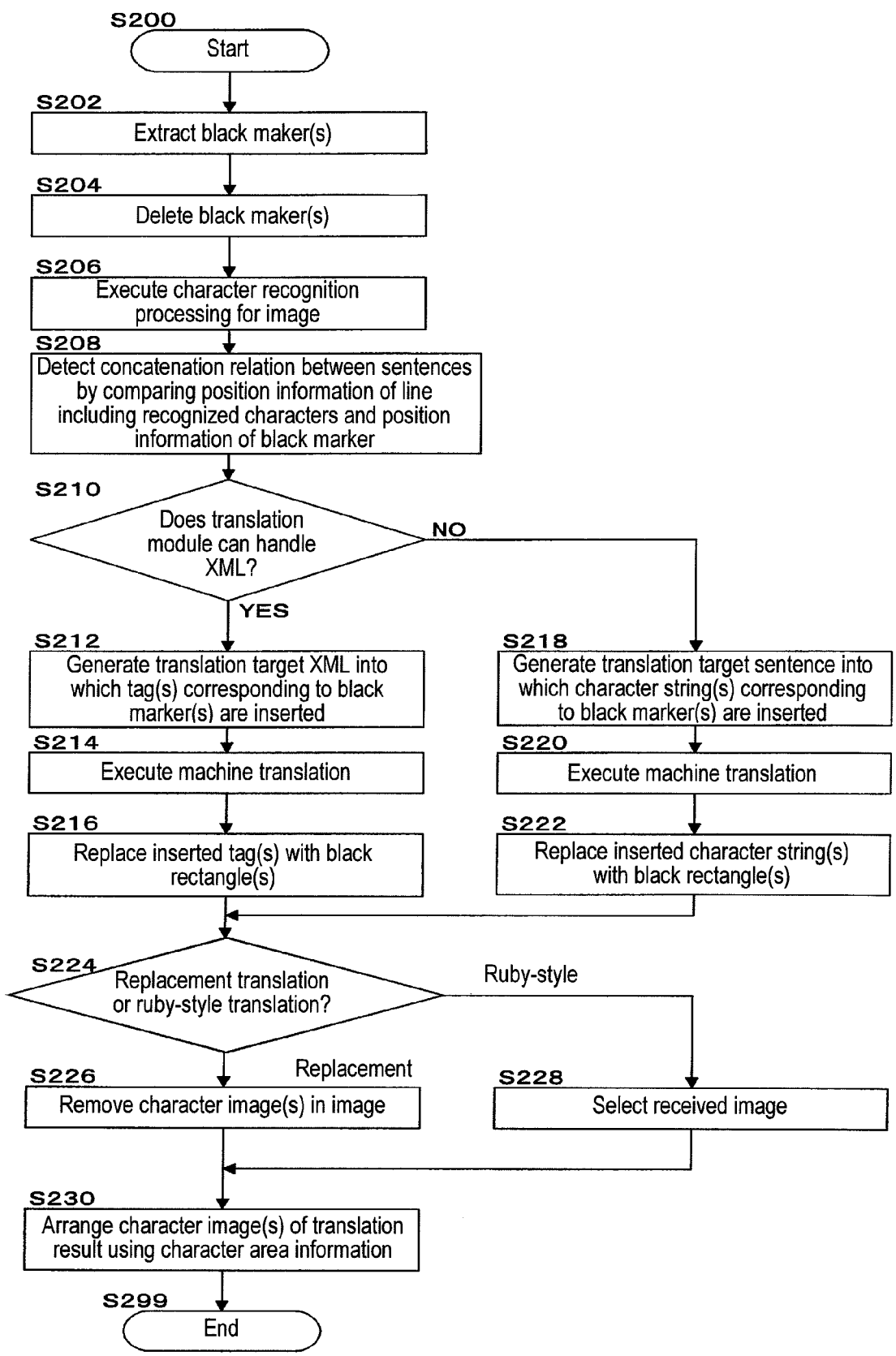
FIG. 2 is a flowchart showing an example of processing according to the exemplary embodiment of the invention.

FIG. 2 is a flowchart showing an example of processing according to this exemplary embodiment. This flowchart will be described with reference to specific examples shown in FIGS. 6 to 14.

Figure 6:
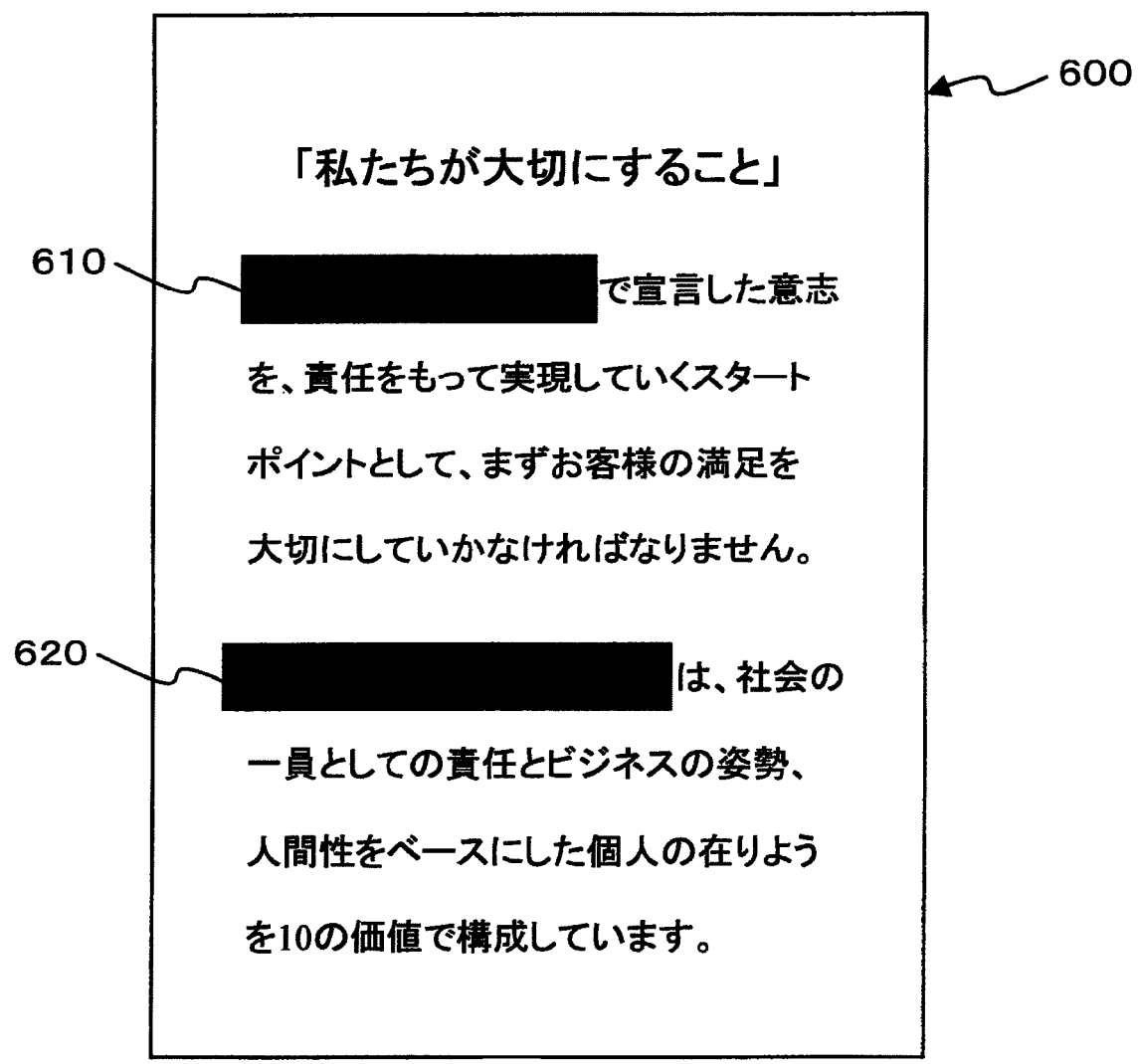
FIG. 6 is an explanatory view showing an example of an image received by an image receiving module.

At step S202, the writing detection module 121 extracts black markers from the image received by the image receiving module 110, and detects positions of the black markers in the image. For example, FIG. 6 is an explanatory view showing an example of the image received by the image receiving module 110. A target image 600 has black markers 610 and 620. That is, two areas are hidden, and the writing detection module 121 extracts the black markers 610 and 620. It is noted that the target image 600 shown in FIGS. 6 to 8 includes Japanese language because it will be translated into English later (which will be descried later).

Figure 7:
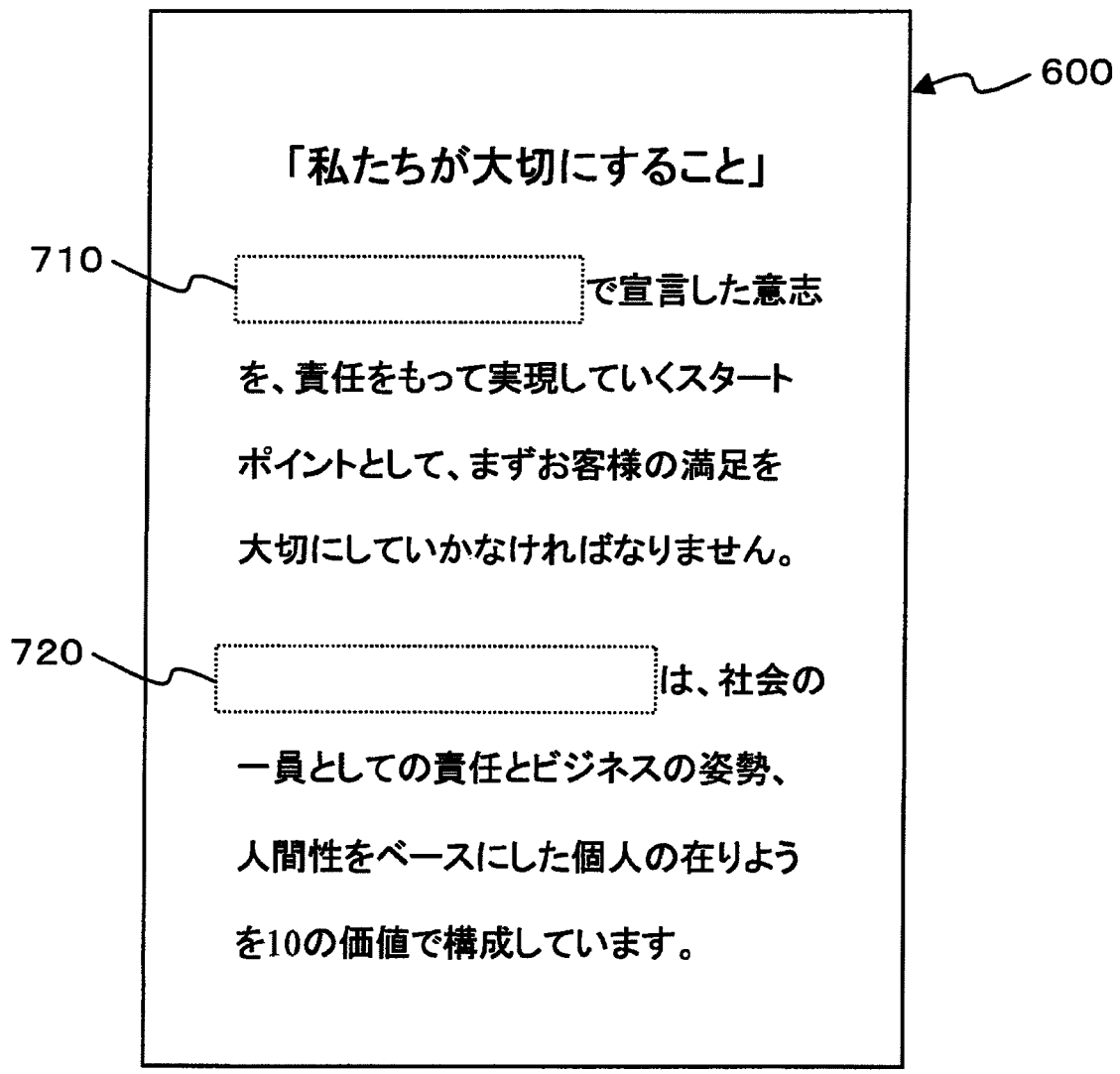
FIG. 7 is an explanatory view showing an example of an image from which black markers have been deleted by a writing deletion module.

At step S204, the writing deletion module 122 deletes the black markers from the image by using the positions of the black markers detected at step S202. FIG. 7 is an explanatory view showing an example of the image from which the black marker 610 has been deleted by the writing deletion module 122. That is, the black marker 610 and the black marker 620 extracted at step S202 are deleted. Then, the black markers 610 and 620 become black marker deleted areas 710 and 720.

At step S206, the layout detection module 131 analyzes the layout in the image from which the black markers have been deleted at step S204, and the character recognition module 132 performs the character recognition processing for the image.

Figure 8:
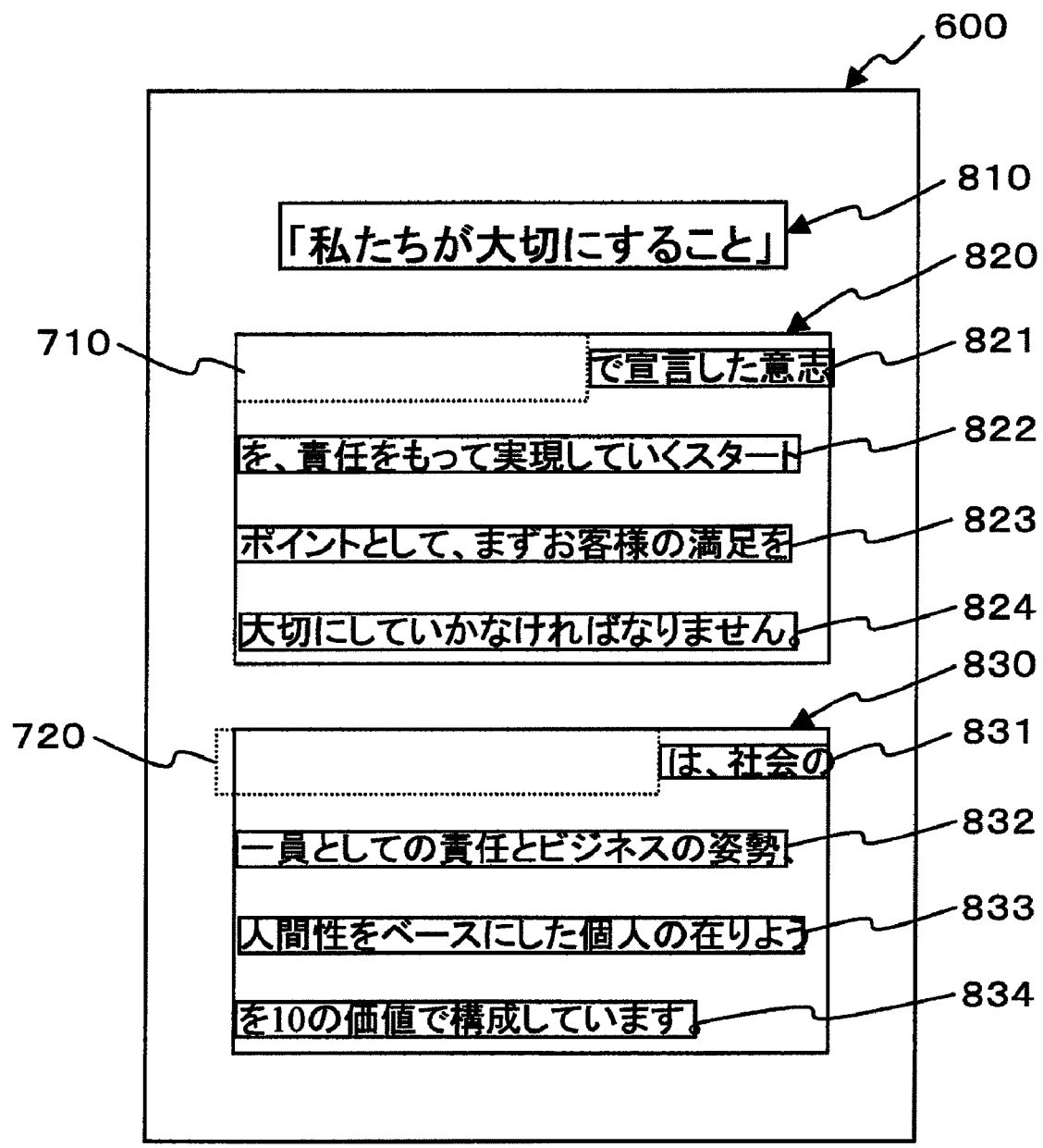
FIG. 8 is an explanatory view showing an example of processing that is performed for a target image by a layout detection module.

FIG. 8 is an explanatory view showing an example of the processing for the target image 600 executed by the layout detection module 131. As a result of the layout analysis, the following are found: The target image 600 includes a text area (character line area) 810, a text area 820, and a text area 830; the text area 820 includes a character line area 821, a character line area 822, a character line area 823, and a character line area 824; the character line area 821 is adjacent to the black marker deleted area 710; the text area 830 includes a character line area 831, a character line area 832, a character line area 833, and a character line area 834; and the character line area 831 is adjacent to the black marker deleted area 720. Then, the character recognition module 132 performs the character recognition processing for the character image in each character line area.

At step S208, the concatenation relation detection module 140 detects a concatenation relation between sentences by comparing the position information (the character line area information column 540 of the layout information table 500) of the line (character line area) including the characters recognized at step S206 with the position information (the position information column 420 of the specified portion table 400) of the black markers. This detection processing will be described later with reference to the flowchart shown in FIG. 3.

At step S210, the translation target character string generation module 150 determines as to whether or not the translation module 160 is capable of handling one described in XML as a translation target. When the translation target character string generation module 150 determines that the translation module 160 is capable, the process proceeds to step S212, and otherwise, the process proceeds to step S218.

At step S212, the translation target character string generation module 150 inserts tags corresponding to the black markers into the result of the recognition at step S206 based on the concatenation relation detected at step S208 to create a translation target XML. FIG. 9 is an explanatory view showing an example of a translation target XML 900. The translation target XML 900 includes a marker tag 910 and a marker tag 920. That is, the character recognition result includes layout information as tags (<region1>, etc.), and the marker tags 910 and 920 (<marker/>), which are tags corresponding to the black markers, are inserted based on the concatenation relation detected at step S208.

Figure 10:
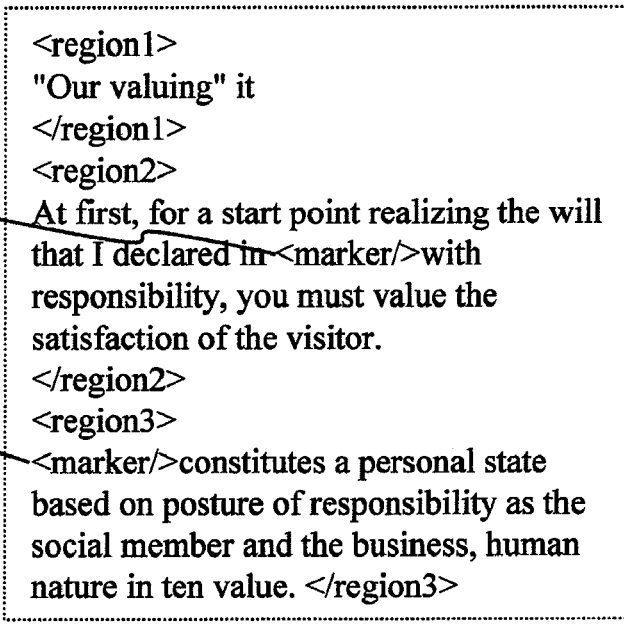
FIG. 10 is an explanatory view showing an example of an after-translation XML.

At step S214, the translation module 160 performs the (machine) translation processing for the translation target XML generated at step S212. In the translation processing performed at this step, the tags corresponding to the black markers are treated as nouns and output as they are in the form of tags as the translation result. FIG. 10 is an explanatory view showing an example of an after-translation XML 1000 that is the translation result. The after-translation XML 1000 includes a marker tag 910 and a marker tag 920. That is, the translation result includes layout information as tags (<region1>, etc.), and translation is performed while the marker tags 910 and 920 (<marker/>), which are tags corresponding to the black markers, are treated as nouns, so that the marker tags 910 and 920 are present in the positions shown in FIG. 10.

At step S216, the translation change module 170 replaces the tags present in the translation result at step S214 with character codes representative of black rectangles.

Figure 11:
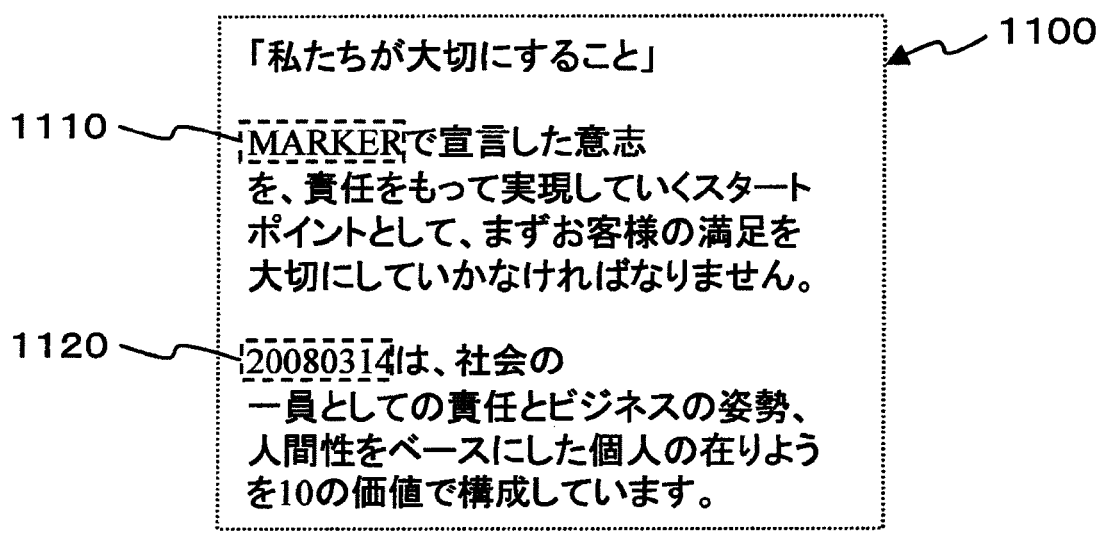
FIG. 11 is an explanatory view showing an example of a translation target text.

At step S218, the translation target character string generation module 150 inserts the character strings corresponding to the black markers into the recognition result at step S206, based on the concatenation relation detected at step S208, thereby generating a translation target text. The character strings corresponding to the black markers may be proper nouns. In particular, when the target language of the translation is English, they may be numerals. FIG. 11 is an explanatory view showing an example of a translation target text 1100. The translation target text 1100 includes a marker character string 1110 and a marker character string 1120. That is, in the character recognition result, the marker character string 1110 ("Marker") and the marker character string 1120 ("20080314") that are character strings corresponding to the black markers are inserted based on the concatenation relation detected at step S208.

Figure 12:
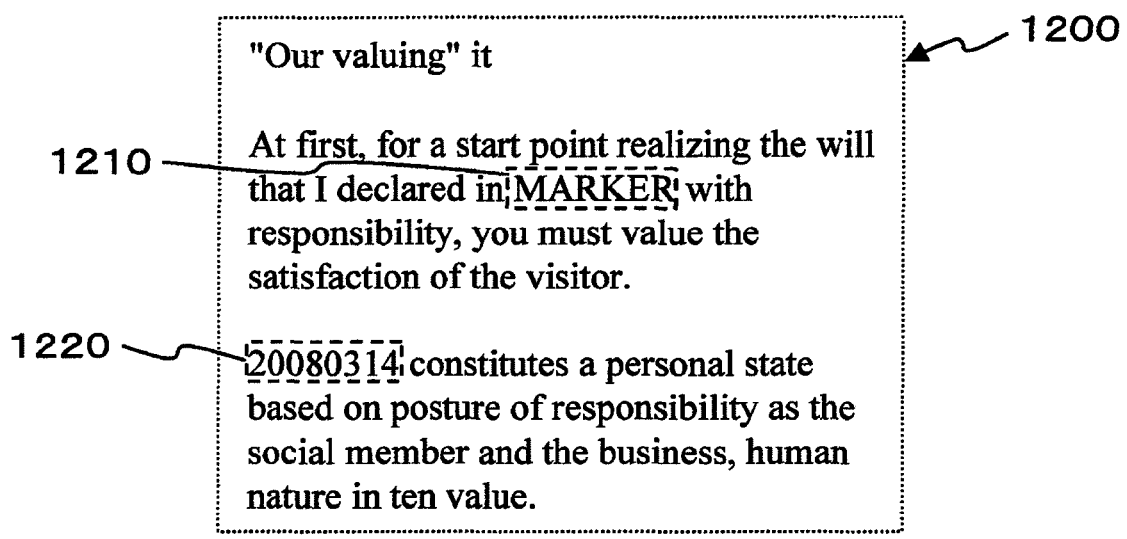
FIG. 12 is an explanatory view showing an example of an after-translation text.

At step S220, the translation module 160 performs the (machine) translation processing for the translation target text generated at step S218. Since the character strings inserted at step S218 are nouns, they are output as it is (that is, without being translated) as the translation result. FIG. 12 is an explanatory view showing an example of an after-translation text 1200 that is the translation result. The after-translation text 1200 includes an after-translation marker character string 1210 and an after-translation marker character string 1220. That is, in the translation result, the marker character strings 1110 and 1120, which are character strings corresponding to the black markers, are translated and consequently, the after-translation marker character strings 1210 and 1220 are present in the positions shown in the example of FIG. 12.

At step S222, the translation change module 170 replaces the character strings, which are inserted at step S218 and are present in the result of the translation at step S220, with character codes representative of the black rectangles.

Figure 13:
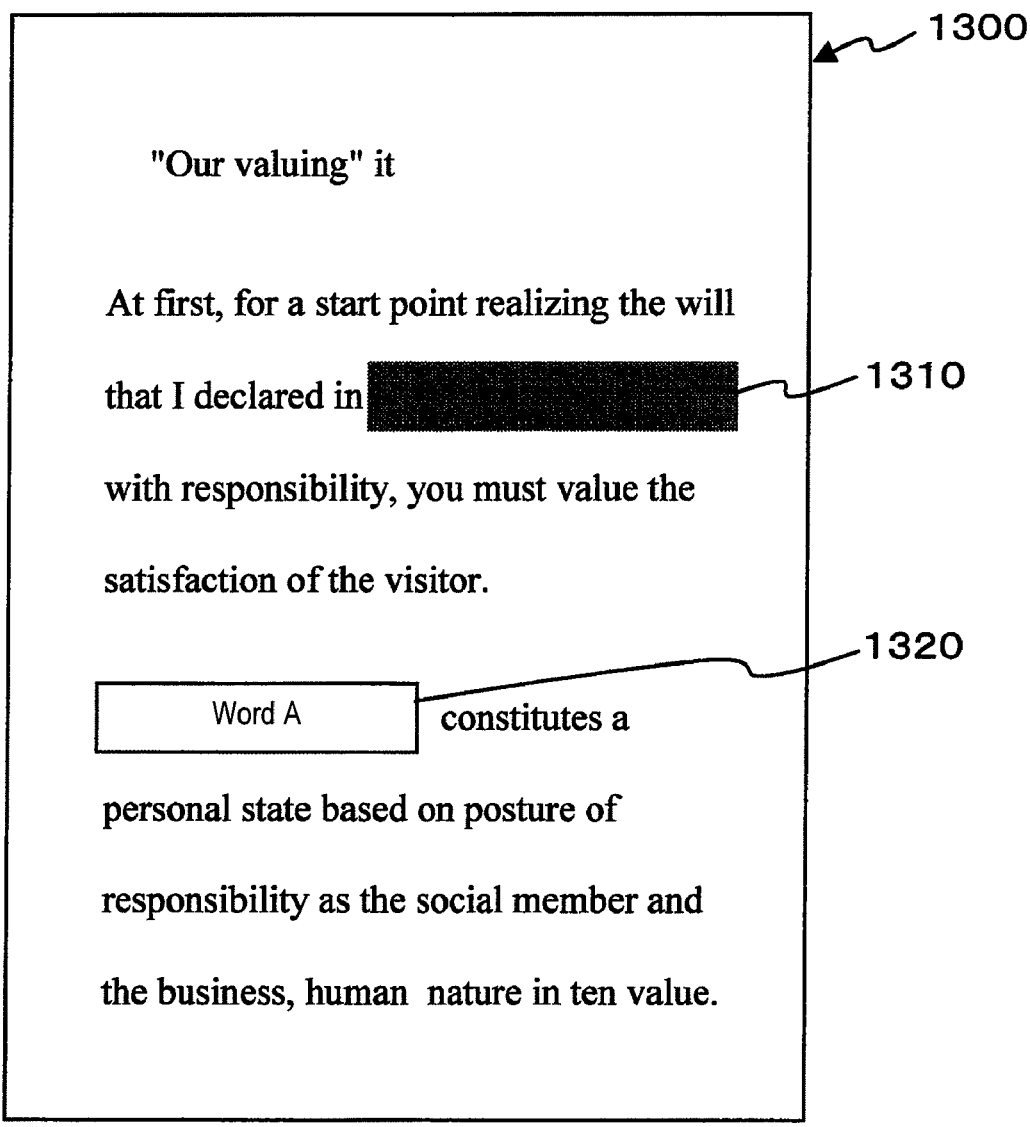
FIG. 13 is an explanatory view showing an example of a translation image where replacement translation is performed.
Figure 14:
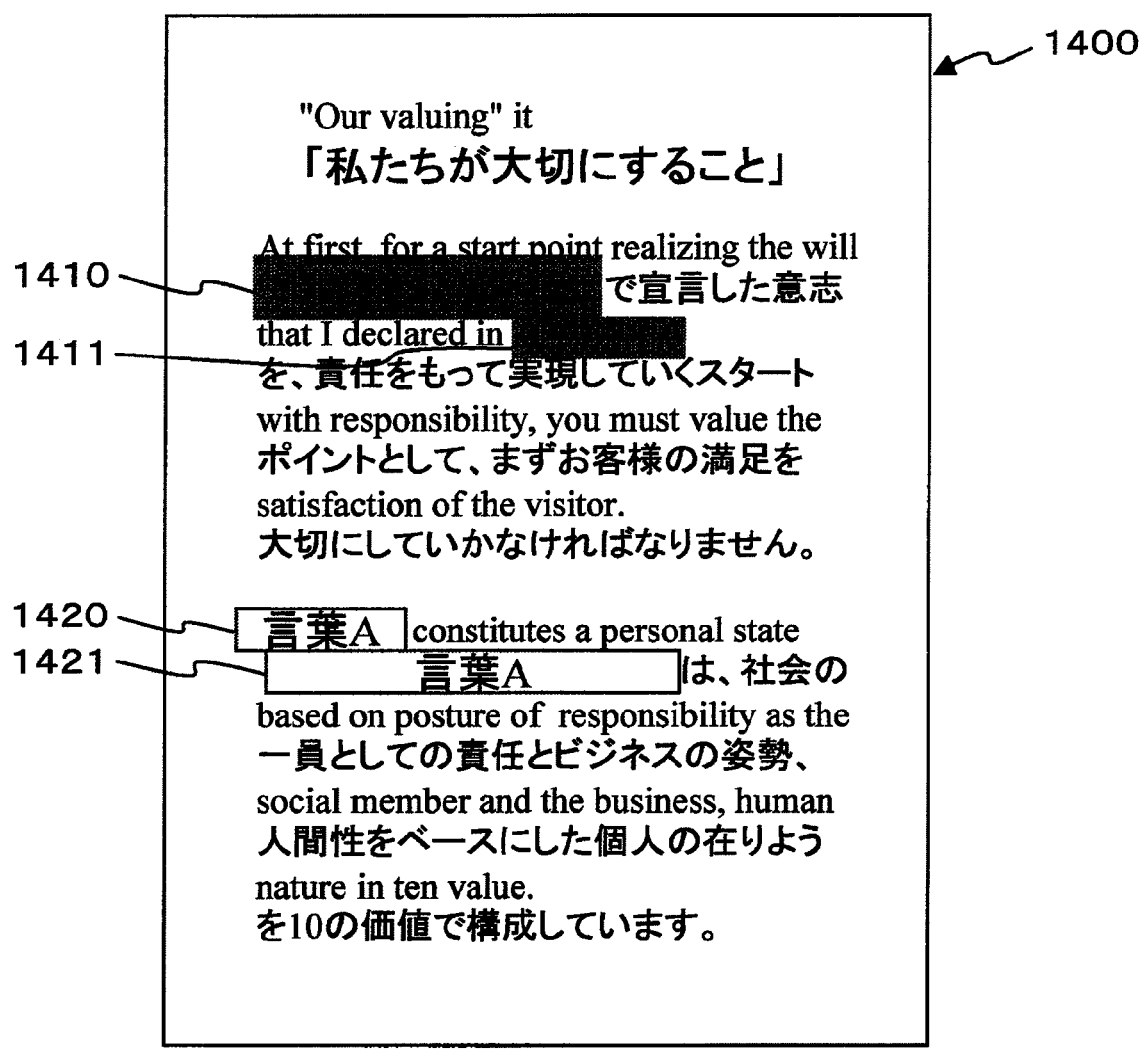
FIG. 14 is an explanatory view showing an example of a translation image where ruby-style translation is performed.

At step S224, the image generation module 180 determines whether to choose replacement translation (an output in which the character image(s) of the original image are not left but overwritten with the translation result, see FIG. 13) or ruby-style translation (an output in which the character image(s) of the original image are left as they are and the translation result is arranged so as to correspond to the character image(s) of the original image like ruby characters, see FIG. 14) as an output format. In this exemplary embodiment, this determination is made according to a user's operation or a predetermined output format.

At step S226, the image generation module 180 removes the character images in the layout analyzed at step S206, from the image from which the black markers have been deleted at step S204. That is, the character images to be translated are deleted from the original image. Thereby, images other than the character image (for example, a figure and a photo image) are left in the image.

At step S228, the image generation module 180 selects the image received by the image receiving module 110, as the image to be output. The selected image is an object to be processed at step S230.

At step S230, the image generation module 180 arranges the character images of the translation result (the result of the processing of step S216 and step S222) based on the text area information (the text area information column 520 of the layout information table 500) in the layout analyzed at step S206. In doing this, in the case where the output format is replacement translation, the image generation module 180 arranges it according to the language of the translation result in the text area. In the case where the output format is the ruby-style translation, since the original character image is present in the text area, the image generation module 180 arranges the character images of the translation result between the lines. Then, the output module 190 outputs an image in which the character images of the translation result are arranged. When the image corresponding to each black marker, that is, the character image of the character code representative of each black rectangle is generated, the overall length of the hiding character image may be determined so as to be proportional to the length of each black marker extracted at step S202.

FIG. 13 is an explanatory view showing an example of a translation image 1300 obtained through the replacement translation. The translation image 1300 is a translation image when the processing of step S226 is performed. That is, since the result of the layout analysis at step S206 is used, the translation image 1300 has a layout equivalent to that of the target image 600. The translation result is arranged in the text area extracted from the target image 600. The translation image 1300 includes masking areas 1310 and 1320 corresponding to the black markers 610 and 620, respectively. The configuration (the color, the shape, the character string presented in the rectangle, and a combination thereof) of the masking areas may differ according to an order of the extracted markers. While the masking area 1320 is a "word A" in FIG. 13, it may be a character string representative of characters being hidden.

FIG. 14 is an explanatory view showing an example of a translation image 1400 obtained through the ruby-style translation. The translation image 1400 is a translation image when the processing of step S228 is performed. That is, since the image received by the image receiving module 110 is used as it is, the translation result is arranged between the lines based on the result of the layout analysis of step S206.

Here, the configurations of the black markers and the masking areas may differ according to an order of the extracted black markers. That is, the translation image 1400 includes masking areas 1410, 1411, 1420, and 1421. The masking area 1410 is obtained by modifying the configuration of the black marker 610. The masking area 1411 is a translation portion corresponding to the black marker 610 and has an equivalent configuration to the masking area 1410. The masking area 1420 is obtained by modifying the configuration of the black marker 620. The masking area 1421 is a translation portion corresponding to the black marker 620 and has an equivalent configuration to the masking area 1420.

Figure 3:
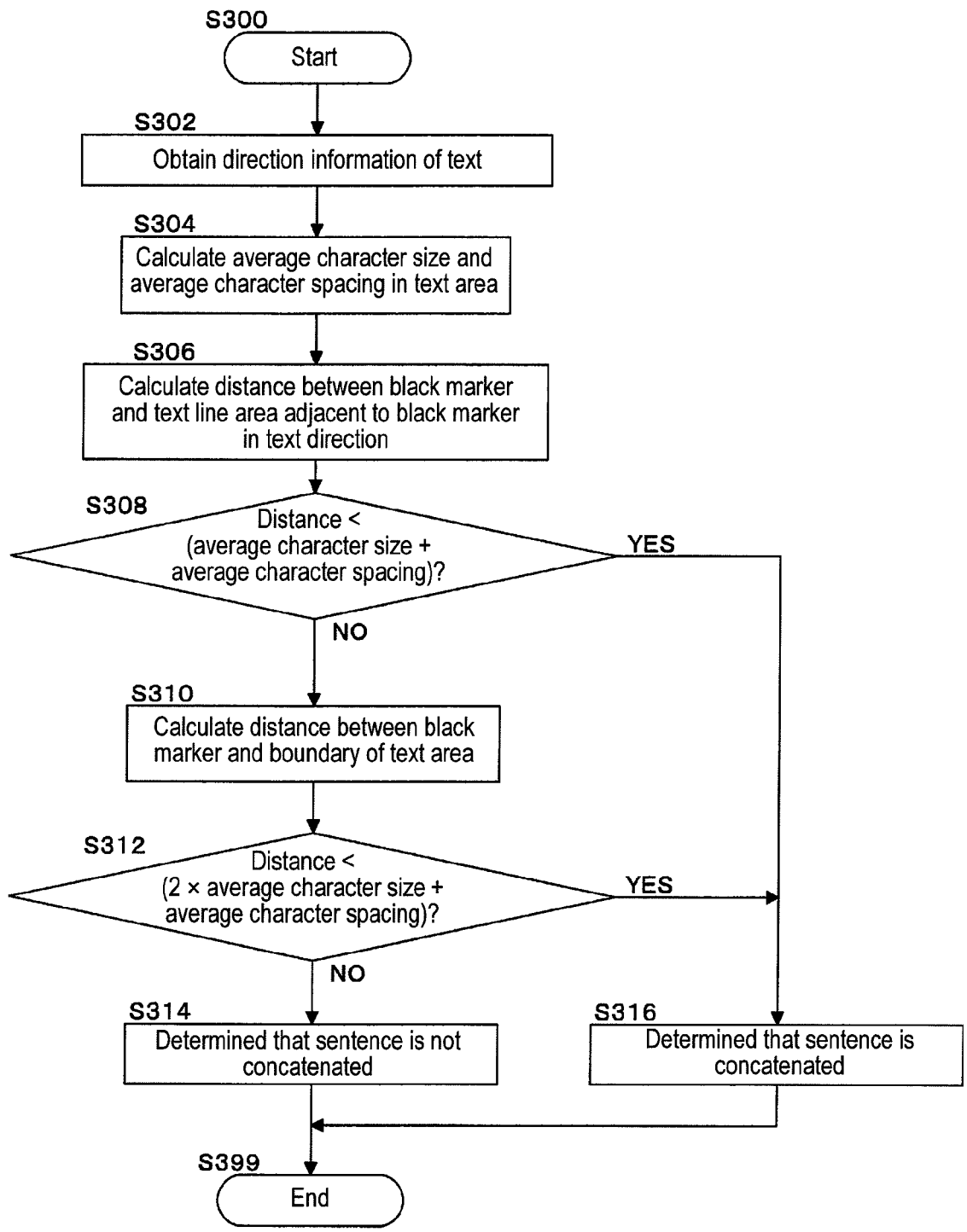
FIG. 3 is a flowchart showing an example of processing of determining a concatenation relation.

FIG. 3 is a flowchart showing an example of the processing of determining the concatenation relation. That is, details of the processing of step S208 performed by the concatenation relation detection module 140 in the flowchart shown in the example of FIG. 2 will be described. The description on the flowchart shown in FIG. 3 will be given with reference to specific examples shown in FIGS. 15 and 16.

At step S302, an aspect ratio of the character line is obtained from the character line area information in the layout detected by the layout detection module 131, thereby obtaining a text direction (characters are written (arranged) in horizontally or vertically).

At step S304, an average character size of the character images present in the text area in the layout detected by the layout detection module 131 (in the case where characters are written horizontally, an average width of character images, and in the case where characters are written vertically, an average height of character images) and an average character spacing are calculated. In calculating the averages, the number of character images present in the text area is used as a total number.

Figure 15:
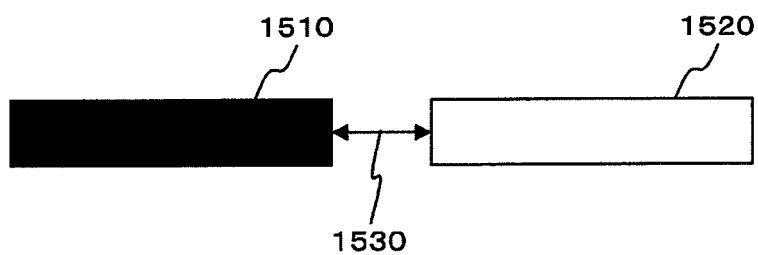
FIG. 15 is an explanatory view showing an example of a relationship between a black marker and a character line area.

At step S306, a distance between each black marker detected by the writing detection module 121 and the character line area adjacent to each black marker in the text direction extracted at step S302 is calculated. For example, as shown in the example of FIG. 15, when characters are written (arranged) horizontally, a character line area 1520 is adjacent to a black marker 1510, and a distance 1530 therebetween is calculated. When the number of calculated distances is two (when a black marker is sandwiched between the character lines), the shorter one of the distances may be adopted.

At step S308, it is determined based on the distance calculated at step S306 and the average character size and the average character spacing calculated at step S304, as to whether or not the black marker is concatenated with the adjacent character line area as a sentence. For example, when the following conditional expression 1 is satisfied, the process proceeds to step S316, and otherwise, the process proceeds to step S310:

$$\text{Distance}<(\text{average character size}+\text{average character spacing}) \quad (1)$$

This conditional expression 1 is for determining as to whether or not the black marker in interest hides characters in the character line.

Figure 16:
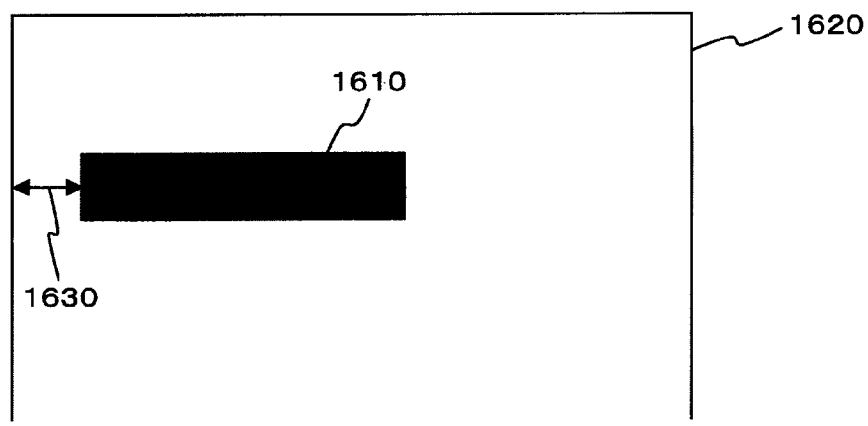
FIG. 16 is an explanatory view showing an example of a relationship between a black marker and a text area.

At step S310, the distance between each black marker detected by the writing detection module 121 and a boundary of the text area including each black marker is calculated. For example, as shown in the example of FIG. 16, a text area 1620 includes a black marker 1610, and a distance 1630 from the boundary of the text area 1620 to the black marker 1610 is calculated. Distances between a black marker and boundaries of text areas that are present in the text direction extracted at step S302 with respect to the black marker may be calculated. In this case, the shorter one of the calculated distances may be adopted.

At step S312, it is determined based on the distance calculated at step S310 and the average character size and the average character spacing calculated at step S304, as to whether or not the black marker is concatenated as a sentence in the text area including the black marker. For example, when the following conditional expression 2 is satisfied, the process proceeds to step S316, and otherwise, the process proceeds to step S314:

$$\text{Distance}<(2\times\text{average character size}+\text{average character spacing}) \quad (2)$$

This conditional expression 2 is for determining as to whether or not the black marker hides characters in the text area.

At step S314, it is determined that the sentence is not concatenated. That is, settings are made so that a code corresponding to a black marker can be treated as an independent character string (there is a return or a blank character before and after that).

At step S316, it is determined that the sentence is concatenated. That is, settings are made so that the black marker can be treated as a part of a sentence.

Figure 17:
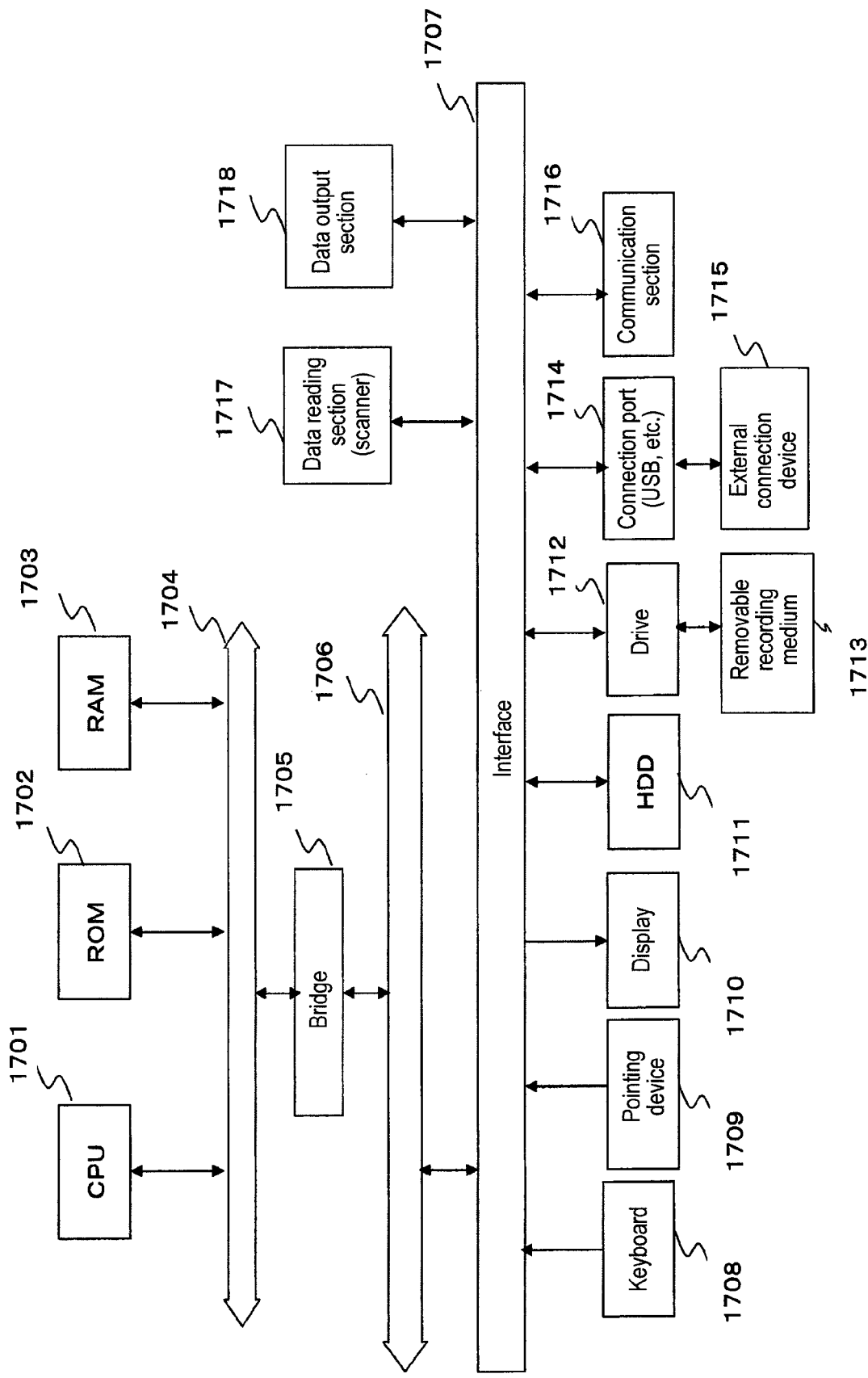
FIG. 17 is a block diagram showing an example of the hardware structure of a computer implementing the exemplary embodiment of the invention.

Referring to FIG. 17, a hardware structure example of this exemplary embodiment will be described. The structure shown in FIG. 17 is constituted by, for example, a personal computer (PC), and a hardware structure example is shown that includes a data reading section 1717 such as a scanner and a data output section 1718 such as a printer.

A CPU (central processing unit) 1701 is a control section that executes processings according to computer programs describing execution sequences of the modules described in the above-described embodiment, that is, the modules such as the writing processing module 120, the character processing module 130, the concatenation relation detection module 140, the translation target character string generation module 150, the translation module 160, the translation change module 170, and the image generation module 180.

A ROM (read only memory) 1702 stores programs, operation parameters, and the like used by the CPU 1701. A RAM (random access memory) 1703 stores programs used in the execution of the CPU 1701, parameters that appropriately varies in the execution, and the like. These are interconnected through a host bus 1704 constituted by a CPU bus or the like.

The host bus 1704 is connected to an external bus 1706 such as a PCI (peripheral component interconnect/interface) bus through a bridge 1705.

A keyboard 1708 and a pointing device 1709 such as a mouse are input devices operated by the operator. A display 1710 examples of which include a liquid crystal display and a CRT (cathode ray tube) display displays various pieces of information as text and image information.

An HDD (hard disk drive) 1711 incorporates a hard disk, and drives the hard disk to record or reproduce programs executed by the CPU 1701 and information. The hard disk stores images accepted by the image receiving module 110, the character recognition results by the character recognition module 132, the translation results by the translation module 160, and the like. Further, the hard disk stores other various data processing programs and various computer programs.

A drive 1712 reads data or a program recorded on an attached removable recording medium 1713 such as a magnetic disk, an optical disk, a magneto-optical disk, or a semiconductor memory, and supplies the data or the program to the RAM 1703 connected through an interface 1707, the external bus 1706, the bridge 1705, and the host bus 1704. The removable recording medium 1713 can also be used as a data recording area similar to the hard disk.

A connection port 1714 is for connecting an external connection device 1715, and includes connection sections such as USB and IEEE1394. The connection port 1714 is connected to the CPU 1701 and the like through the interface 1707, the external bus 1706, the bridge 1705, the host bus 1704, and the like. A communication section 1716 is connected to a network, and executes the processing of data communication with the outside. A data reading section 1717 is, for example, a scanner, and executes the processing of document reading. A data output section 1718 is, for example, a printer, and executes the processing of document data output.

The hardware structure shown in FIG. 17 is a structure example, and this exemplary embodiment is not limited to the structure shown in FIG. 17 but may adopt any hardware structure that is capable of executing the modules described in this exemplary embodiment. For example, some of the modules may be constituted by dedicated hardware such as an ASIC (application specific integrated circuit), some of the modules may be present in an external system and connected by a communication line, and further, a plurality of the systems shown in FIG. 17 may be interconnected by a communication line so as to operate in cooperation with each other. Moreover, this exemplary embodiment may be incorporated in a copier, a fax, a scanner, a printer, a multifunction apparatus (an image processing apparatus having two or more of the scanner, printer, copier, and fax functions), and the like.

While the black markers are shown as the writings in the above-described embodiment, they may be strikethroughs or the like. This exemplary embodiment is particularly suitable for a case where a writing degrades the character recognition rate and this degrades the quality of the translation.

The described programs may be provided by being stored in a recording medium, or the programs may be provided through communication unit. In that case, for example, the described programs may be regarded as an invention of a "computer-readable recording medium recording a program".

The "computer-readable recording medium recording a program" refers to a computer-readable recording medium recording a program which recording medium is used for installing and executing a program, distributing a program, or the like.

Examples of the recording medium include: DVDs (digital versatile disks) such as "DVD-R, DVD-RW, DVD-RAM" which are standards developed by the DVD forum and "DVD+R, DVD+RW" which are standards developed by DVD+RW; compact disks (CDs) such as a read-only memory (CD-ROM), a CD-recordable (CD-R), and a CD-rewritable (CD-RW); a blue-ray disk; a magneto-optical disk (MO); a flexible disk (FD); a magnetic tape; a hard disk; a read only memory (ROM); an electrically erasable and rewritable read only memory (EEPROM); a flash memory; and a random access memory (RAM).

The programs or some of them may be stored or distributed in a state of being recorded in the recording medium. Moreover, they may be transmitted through communication by using a transmission medium such as a wire network used for a local area network (LAN), a metropolitan area network (MAN), a wide-area network (WAN), the Internet, an intranet, and an extranet, a wireless communication network, or a combination thereof, or may be conveyed on a carrier wave.

Further, the programs may be part of other programs, or may be recorded in a recording medium with another program. Moreover, they may be recorded in a state of being divided to a plurality of recording media. Moreover, they may be recorded in any form such as a compressed form or an encrypted form as long as they are restorable.

What is claimed is:

1. An image processing apparatus comprising:
    an image receiving unit that receives an image including a writing;
    a writing detection unit that detects a position of the writing in the image received by the image receiving unit;
    a writing deletion unit that deletes the writing from the received image based on the position of the writing detected by the writing detection unit;
    a character recognition unit that recognizes characters in the image from which the writing has been deleted by the writing deletion unit;
    a translation target character string generation unit that generates a translation-target character string by inserting a code representative of the writing into a result of the recognition by the character recognition unit based on the position of the writing detected by the writing detection unit;
    a translation unit that translates the translation-target character string generated by the translation target character string generation unit;
    a translation image generation unit that generates, based on a result of the translation by the translation unit, an image of the result of the translation that includes an image corresponding to the writing;
    a positional relation detection unit that detects a positional relation between the writing detected by the writing detection unit and an image component other than the writing; and
    a concatenation relation detection unit that detects a concatenation relation between the writing and the image component based on the positional relation detected by the positional relation detection unit, wherein
    the translation target character string generation unit generates the translation-target character string by inserting the code representative of the writing into the result of the recognition by the character recognition unit based on the concatenation relation detected by the concatenation relation detection unit.

2. The image processing apparatus according to claim 1, wherein the translation unit translates the translation-target character string while treating the code representative of the writing as a noun.

3. An image processing apparatus comprising:
    an image receiving unit that receives an image including a writing;
    a writing detection unit that detects a position of the writing in the image received by the image receiving unit;
    a writing deletion unit that deletes the writing from the received image based on the position of the writing detected by the writing detection unit;
    a character recognition unit that recognizes characters in the image from which the writing has been deleted by the writing deletion unit;
    a translation target character string generation unit that generates a translation-target character string by inserting a code representative of the writing into a result of the recognition by the character recognition unit based on the position of the writing detected by the writing detection unit;
    a translation unit that translates the translation-target character string generated by the translation target character string generation unit;
    a translation image generation unit that generates, based on a result of the translation by the translation unit, an image of the result of the translation that includes an image corresponding to the writing; and
    a translation conversion unit that converts a portion, corresponding to the code representative of the writing, of the result of the translation into a code for generating the image corresponding to the writing, wherein
    the translation image generation unit generates the image of the result of the translation based on the code from generating the image corresponding to the writing.

4. An image processing apparatus comprising:
    an image receiving unit that receives an image including a writing;
    a writing detection unit that detects a position of the writing in the image received by the image receiving unit;
    a writing deletion unit that deletes the writing from the received image based on the position of the writing detected by the writing detection unit;
    a character recognition unit that recognizes characters in the image from which the writing has been deleted by the writing deletion unit;
    a translation target character string generation unit that generates a translation-target character string by inserting a code representative of the writing into a result of the recognition by the character recognition unit based on the position of the writing detected by the writing detection unit;
    a translation unit that translates the translation-target character string generated by the translation target character string generation unit; and
    a translation image generation unit that generates, based on a result of the translation by the translation unit, an image of the result of the translation that includes an image corresponding to the writing, wherein the writing is an image hiding a character in the image, the writing detection unit further detects a length of the writing, and the translation image generation unit generates a hiding image as the image corresponding to the writing, according to the length of the writing detected by the writing detection unit.

5. An image processing method comprising:

receiving an image including a writing;

detecting a position of the writing in the received image;

deleting the writing from the received image based on the detected position of the writing;

recognizing characters in the image from which the writing has been deleted;

generating, using a processor, a translation-target character string by inserting a code representative of the writing into a result of the recognition based on the detected position of the writing;

translating the generated translation-target character string;

generating, based on a result of the translation, an image of the result of the translation that includes an image corresponding to the writing, detecting a positional relation between the detected writing and an image component other than the writing; and detecting a concatenation relation between the writing and the image component based on the detected positional relation, wherein the generating the translation target character string comprises generating the translation-target character string by inserting the code representative of the writing into the result of the recognition based on the detected concatenation relation.

6. A non-transitory computer-readable medium storing a program that causes a computer to execute image processing, the image processing comprising:

receiving an image including a writing;

detecting a position of the writing in the received image;

deleting the writing from the received image based on the detected position of the writing;

recognizing characters in the image from which the writing has been deleted;

generating a translation-target character string by inserting a code representative of the writing into a result of the recognition based on the detected position of the writing;

translating the generated translation-target character string;

generating, based on a result of the translation, an image of the result of the translation that includes an image corresponding to the writing;

detecting a positional relation between the detected writing and an image component other than the writing; and detecting a concatenation relation between the writing and the image component based on the detected positional relation, wherein the generating the translation target character string comprises generating the translation-target character string by inserting the code representative of the writing into the result of the recognition based on the detected concatenation relation.

* * * * *